United States Patent
Basson et al.

(10) Patent No.: US 9,165,280 B2
(45) Date of Patent: Oct. 20, 2015

(54) PREDICTIVE USER MODELING IN USER INTERFACE DESIGN

(75) Inventors: Sara H. Basson, White Plains, NY (US); Dimitri Kanevsky, Ossining, NY (US); Daniel A. Oblinger, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1080 days.

(21) Appl. No.: 11/062,382

(22) Filed: Feb. 22, 2005

(65) Prior Publication Data

US 2006/0190822 A1    Aug. 24, 2006

(51) Int. Cl.
| | |
|---|---|
| *G06F 3/00* | (2006.01) |
| *G06F 3/048* | (2013.01) |
| *G06Q 10/10* | (2012.01) |
| *G05D 1/00* | (2006.01) |
| *G05D 3/00* | (2006.01) |
| *G06F 7/00* | (2006.01) |
| *G06F 17/00* | (2006.01) |

(52) U.S. Cl.
CPC ...................................... *G06Q 10/10* (2013.01)

(58) Field of Classification Search
None
See application file for complete search history.

(56) References Cited

U.S. PATENT DOCUMENTS

| | | | | |
|---|---|---|---|---|
| 5,239,700 A | * | 8/1993 | Guenther et al. | 455/158.4 |
| 5,426,732 A | | 6/1995 | Boies et al. | 395/161 |
| 5,465,079 A | * | 11/1995 | Bouchard et al. | 340/576 |
| 5,515,285 A | * | 5/1996 | Garrett, Sr. et al. | 701/300 |
| 5,726,688 A | | 3/1998 | Siefert et al. | 345/352 |
| 6,023,674 A | * | 2/2000 | Mekuria | 704/233 |
| 6,236,968 B1 | * | 5/2001 | Kanevsky et al. | 704/275 |
| 6,308,157 B1 | | 10/2001 | Vanbuskirk et al. | 704/275 |
| 6,323,884 B1 | | 11/2001 | Bird et al. | 345/810 |
| 6,366,207 B1 | * | 4/2002 | Murphy | 340/576 |
| 6,434,450 B1 | * | 8/2002 | Griffin, Jr. et al. | 701/1 |
| 6,453,285 B1 | * | 9/2002 | Anderson et al. | 704/210 |
| 6,489,968 B1 | | 12/2002 | Ortega et al. | 345/713 |
| 6,505,155 B1 | | 1/2003 | Vanbuskirk et al. | 704/246 |
| 6,515,681 B1 | | 2/2003 | Knight | 345/751 |
| 6,570,592 B1 | | 5/2003 | Sajdak et al. | 345/769 |
| 6,604,090 B1 | | 8/2003 | Tackett et al. | 706/11 |
| 6,654,895 B1 | | 11/2003 | Henkhaus et al. | 713/320 |

(Continued)

FOREIGN PATENT DOCUMENTS

| | | |
|---|---|---|
| EP | 336560 A2 | 10/1989 |
| WO | WO99 34284 | 7/1999 |

OTHER PUBLICATIONS

Fatma Nasoz, Onur Ozyer, Christine L. Lisetti, and Neal Finkelstein, Multimodal Affective Driver Interfaces for Future Cars, Dec. 2002, ACM, pp. 319-322.*

(Continued)

*Primary Examiner* — Yongjia Pan
(74) *Attorney, Agent, or Firm* — Noah A. Sharkan; John Pivnichny

(57) ABSTRACT

Dynamic modification of user interfaces is disclosed, based upon identification of the current state of the user and the sensing of a particular situation in which the user is involved and/or environment in which the user is situated. In particular, emotional and mental states of a user are identified and these states are taken into consideration when creating and/or adapting an interface to be used by the user. The interface is modified/created automatically based on identified user biometrics, that is, measured physical properties of the user.

18 Claims, 4 Drawing Sheets

(56) References Cited

U.S. PATENT DOCUMENTS

| | | | |
|---|---|---|---|
| 6,671,667 B1* | 12/2003 | Chandran et al. | 704/233 |
| 6,731,925 B2* | 5/2004 | Naboulsi | 455/345 |
| 6,879,969 B2* | 4/2005 | Engstrom et al. | 706/20 |
| 7,088,250 B2* | 8/2006 | Yasushi | 340/573.1 |
| 7,149,653 B2* | 12/2006 | Bihler et al. | 702/182 |
| 7,574,357 B1* | 8/2009 | Jorgensen et al. | 704/236 |
| 7,665,024 B1* | 2/2010 | Kondziela | 715/745 |
| 7,940,914 B2* | 5/2011 | Petrushin | 379/265.06 |
| 8,140,344 B2* | 3/2012 | Kameyama | 705/7.29 |
| 2001/0008850 A1* | 7/2001 | Komata | 463/37 |
| 2002/0069071 A1* | 6/2002 | Knockeart et al. | 704/275 |
| 2002/0149611 A1* | 10/2002 | May | 345/706 |
| 2003/0181822 A1* | 9/2003 | Victor | 600/558 |
| 2004/0054452 A1* | 3/2004 | Bjorkman | 701/29 |
| 2004/0204157 A1* | 10/2004 | Remboski et al. | 455/569.1 |
| 2006/0149428 A1* | 7/2006 | Kim et al. | 701/1 |
| 2006/0200285 A1* | 9/2006 | Obradovich | 701/30 |

OTHER PUBLICATIONS

Luca Chittaro and Luca De Marco, Driver Distraction Caused by Mobile Devices: Studying and Reducing Safety Risks, Jun. 2004, pp. 1-19.*

The next revolution: vehicle user interfaces, Feb. 2004, ACM, pp. 40-47.*

Liu Qiao, Mitsuo Sato, Kenichi Abe, and Hiroshi Takeda, Self-supervised Learning Algorithm of Environment Recognition in Driving 'Vehicle, Nov. 1996, IEEE Transactions on SYSThMS, Man, and Cybernetics-Part A Systems and Humans, vol. 26, No. 6, pp. 843-850.*

Liu Qiao, Mitsuo Sato, and Hiroshi Takeda, Learning Algorithm of Environmental Recognition in Driving Vehicle, Jun. 1995, IEEE Transactions on Systems, Man, and Cybernetics, vol. 25, No. 6, pp. 917-925.*

Klaus-Dieter Kuhnert and Michael Krödel, A Learning Autonomous Driver System on the Basis of Image Classification and Evolutional Learning, 2003, pp. 400-412.*

"Context Based Next Command Prediction," *IBM Technical Disclosure Bulletin*, vol. 36, No. 7, pp. 535-538 (Jul. 1993).

"Object Interactions in Graphical Interface for Print Administration," *IBM Technical Disclosure Bulletin*, vol. 39, No. 10, pp. 91-92 (Oct. 1996).

Korvemaker et al., "Predicting UNIX Command Lines: Adjusting to User Patterns," (Mar. 20-22, 2000).

* cited by examiner

PREDICTIVE USER MODELING IN USER INTERFACE DESIGN

BACKGROUND OF THE INVENTION

1. Field of the Invention

The present invention relates to the field of predictive user modeling, and more particularly, to the use of predictive user modeling in connection with the design of a user interface.

2. Description of the Related Art

User interfaces appear in many aspects of life today. Simple examples include elevator systems that "speak" instructions, game controllers for video games, and even something as simple as a computer keyboard.

A more complex example is the OnStar telematics systems available in almost all GM vehicles today. The field of telematics is often considered a cross between communications and computer systems. In the OnStar system, a computer, a wireless connection to either an operator or data service like the Internet, and a global positioning system (GPS) are used in a coordinated fashion to provide a driver of the vehicle with the ability to use an interface (e.g., press a button) in the vehicle and be connected to an operator who knows the exact position of the vehicle based on the GPS system. The driver may talk with the system operator and activate controls in the vehicle, which activation can be sensed by the system operator, and/or the system operator can perform functions remotely (e.g., unlock doors) with or without the driver's request.

From the perspective of the driver, the interface comprises a push button in the car, a communication system (microphone and speaker) and could also include visual indicators (e.g., lights) indicating various functions or operations and/or display screen for displaying text, video, etc.

Considerable knowledge has accrued about user interface design and preferred user interfaces. Typically, user interfaces are static, that is, they are designed ahead of time and, once implemented, cannot be changed. Thus, designers must anticipate, in advance, the needs of the interface user and then provide interface elements to accommodate these needs. If, during the use of the interface, a new interface element that would be helpful is identified (e.g., if a user using a push button to connect with an OnStar operator determines that a voice-activated, hands-free mechanism would be more desirable), significant redesign must take place (software, hardware, or a combination of both) to implement the reconfigured or new interface. In other words, modification to this type of user interface cannot occur on the fly.

There have been some attempts to enable "pseudo-dynamic" modification of user interfaces to match different users' needs. U.S. Pat. No. 5,726,688 to Siefert et al. discloses a predictive, adaptive interface for a computer, wherein a user's interaction with the computer is monitored, and future interactions are predicted, based on previous interactions. The invention adapts the interface to the user's preferences, using the predictions. For example, if a particular user repeatedly selects one option from a given menu, the invention detects this repeated selection, "predicts" that the user will not select other options, and adapts to the user's selection, based on this prediction, by eliminating other options from the user's menu. These attempts are called "pseudo-dynamic" because they are still based on predetermined, anticipated changes (e.g., menu-driven modifications, categorical modifications, etc.), but appear to the user to be dynamic. Although to the computer user it appears that the interface has been dynamically modified to personalize it for that user, in reality the system was merely programmed to recognize the use of the computer by a particular user (e.g., via a logon process) and present an interface known in advance to be desired by that user, while excluding those that appear to be unlikely to be used by that user.

Other methods exist, including responsive information architecture (RIA) and evolutionary systems utilizing genetic algorithms (see, for example, "Creative Evolutionary Systems," by Peter Bentley and David Corne, 2002 Academic Press, San Diego, Calif.). All of the solutions known to applicants, however, rely on previously created modifications to the user interface, i.e., they cannot create a new interface on the fly. Further, none of the prior art systems incorporate user emotional and mental states in the determination as to a particular interface to present to the user.

Accordingly, it would be desirable to have a mechanism to automatically generate an interface, on the fly, from underlying abstract user models, interface prototypes, and current, just-measured data. Optimally, such a system would monitor the user's state (using biometric techniques, for example) and would also determine how that particular user is likely to react to different interface modifications given different situations and environmental conditions, and then create or add to an interface based on the monitored parameters and determined reactions.

SUMMARY OF THE INVENTION

The present invention enables dynamic modification of user interfaces on the fly, based upon identification of the current state of the user and the sensing of a particular situation in which the user is involved and/or environment in which the user is situated. In particular, the present invention identifies emotional and mental states of a user and takes these states into consideration when creating and/or adapting an interface to be used by the user. The interface is modified/created automatically based on identified user biometrics, that is, measured physical properties of the user.

DETAILED DESCRIPTION OF THE PREFERRED EMBODIMENTS

The following terms have the following meanings herein:

"Creation of a User Interface"—creation of a new interface that is not in an existing interface library and that differs from an already-existing interface.

"Additive Modification of User Interface"—an incremental addition to an existing interface.

"Biometrics"—the science of measuring an individual's physical properties. Biometric data refers to data obtained using biometrics.

"Behavioral Biometrics"—relatively stable patterns of observable behavior (e.g. typical gestures or responses to some stimuli). See, for example, U.S. Pat. No. 6,421,453.

"User Emotional State"—emotional conditions such as happiness, crying, nervous etc.

The present invention makes use of applicant's recognition that an intrinsic relationship exists between the user's state, user's environment, and the user interface. Changes in a user's state affect the user interface and, vice versa, changes in the user interface affect the user's state in some predicted fashion to achieve specified goals. Changes in user perceptual factors, for example, perception of some stimuli, the user's attitude, inattitude, situation awareness, etc. are immediately reflected in changes to a user interface and directly affect the user's emotional and mental states in a positive way.

Figure 1A:
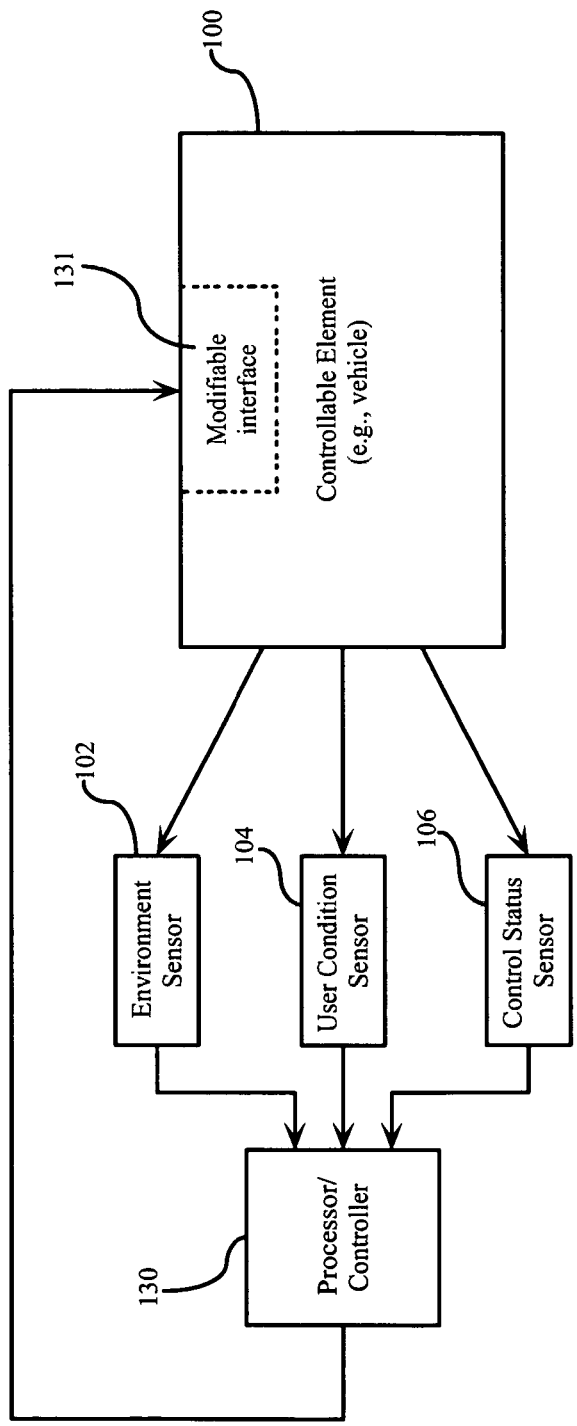
FIG. 1A is a functional block diagram of a system in accordance with the present invention.
Figure 1B:
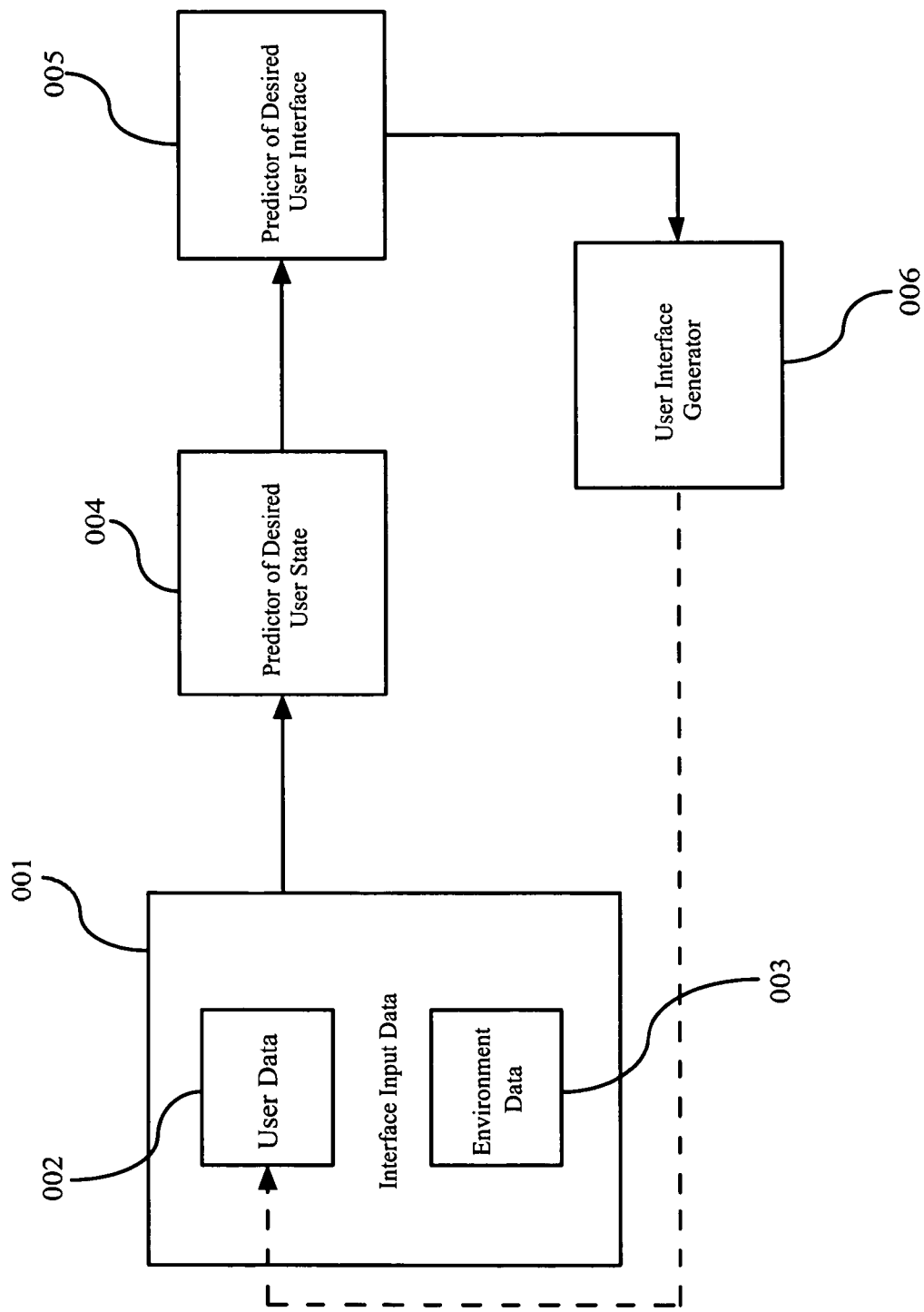
FIG. 1B is a flow diagram illustrating the general concept of the present invention.

FIG. 1A illustrates a functional block diagram of a system in accordance with the present invention, and FIG. 1B is a flow diagram illustrating the general concept of the present invention. Referring to FIGS. 1A and 1B, a controllable element 100 (e.g., a vehicle, a heating system, a control system for a robotic arm, etc.) is coupled to an environment sensor 102, a user condition sensor 104, and an operational control status sensor 106. The environment sensor 102 senses various elements of the environment in and around the controllable element 100. For example, environment sensor 102 could sense weather conditions, lighting conditions, time of day, location and terrain information, sound levels, the number of people in or around the controllable element, the proximity of other vehicles around the controllable element 100, and the like.

User condition sensor 104 senses the condition of the user/operator of the controllable element. For example, user condition sensor 104 can monitor biometric information (heart rate, skin temperature, blood pressure, perspiration, weight, or any other user conditions that are measurable); indications of anxiety (fidgeting, sweating); inattention (behavior indicating distraction; sleepiness, emotion); etc.

Numerous methods are available for measurement of such parameters. For example, heart rate and perspiration levels can be determined by conductance of hands on a steering wheel using known heart rate and/or perspiration sensors. Head position and eye position can be measured via a camera located nearby the user (e.g., in a vehicle, in the vehicle's dashboard); seat motion sensors can measure movement of a person's position in the seat. Sound sensors can be used to measure sounds indicative of movement, emotion, etc.

Each of these sensors measure various elements that can be used to determine information regarding the operator of the controllable element. In the example of a vehicle, persistent movement of the driver in the seat, an increasing heart rate, or increasing perspiration each could be an indication that the driver's anxiety level is increasing. Simultaneous occurrences of more than one of these indications could indicate a severe level of anxiety. Sound sensors can also detect sounds indicating fidgeting movement. Also, sound sensors can sense angry voices, the sound of a baby crying, loud music, all of which can be indicators of a condition in which the driver of the vehicle will be less attentive than normal. Head position and eye position can also indicate whether the driver of the vehicle is or is not paying attention to the road.

Operational control status sensor 106 monitors the operational aspects of the controllable element 100. For example, in the example where the controllable element 100 is a vehicle, the operational control status sensor can monitor the vehicle's location (e.g., via GPS systems), vehicle speed, direction of travel, status of instrumentation and controls, etc. In the case of a heating control system, the operational control status sensor 106 might monitor the temperature sensed by a particular thermostat, the position of vents (e.g., open or closed) and other controllable elements in the heating system.

The sensors 102, 104, and 106 gather and process data interface input data 001, including user data 002 and environment data 003.

Each of the sensors 102, 104, and 106, are coupled to a processor/controller 130 that receives input from each of the sensors 102, 104, 106, and then modifies a modifiable interface 131. Processor/controller 130 serves multiple functions, including functioning as the predictor of desired user states 004 and predictor of desired user interfaces 005, and these predictions are used to generate user interfaces; this function is illustrated by user interface generator 006 in FIG. 1B.

The modifiable interface is illustrated in FIG. 1A as a single interface; however, it is contemplated and understood that multiple interfaces may be coupled to processor controller 130 and that they may be independently or cooperatively controlled. Unlike the systems of the prior art where the process/controlling elements are individually tailored to each of their respective sensors, the present invention, recognizing the importance of an "intrinsic relationship" between the user states (condition), user environment, and user interface, combines the control operations to factor in each of these elements. This intrinsic relationship is illustrated by FIG. 1B. Changes in user states affect the modifiable interface 131, and changes in the modifiable interface 131 affect user states in some predictable fashion to achieve specified goals. Even more specifically, changes in user perceptual factors, such as perception of some stimuli, attitude of the user, attention level of the user, situation awareness, etc. will be immediately reflected in changes made to the modifiable interface and thus will directly affect user emotional and mental states (e.g., attitude, tiredness, drowsiness, alertness, satisfaction) in a positive way.

Figure 2:
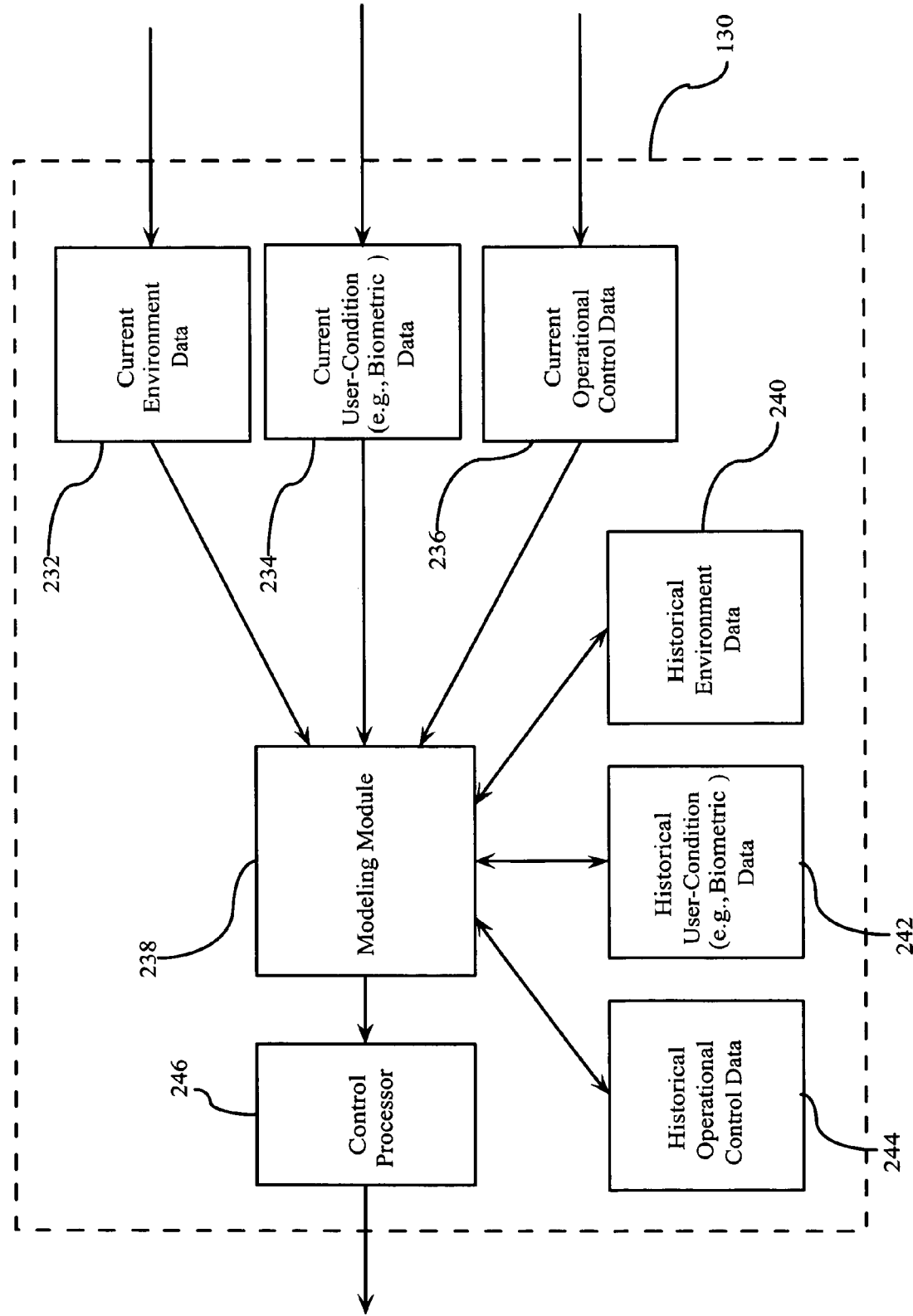
FIG. 2 is a detailed block diagram of processor/controller 130 of FIG. 1A.

FIG. 2 is a more detailed block diagram of processor/controller 130. Referring to FIG. 2, a current environment data storage 232 receives input from environment sensor 102 (not shown); current user-condition data storage 234 receives currently sensed data from user condition sensor 104 (not shown); and current operational control data storage 236 receives currently measured control data from control status sensor 106 (not shown). A modeling module (described in more detail below) 238 receives input from each of the data storages 232, 234, 236.

Modeling module 238 also is coupled to a historical environmental data storage 240, historical user-condition data storage 242, and historical operational control data storage 244. These historical data storage elements provide for archiving of historical data relating to the sensed elements (e.g., environment, user condition, operational control), and also provide access to the archived data by the modeling module 238. The output of the modeling module 238 goes to a control processor 246, which outputs control signals to the controllable element 100 of FIG. 1 via the modifiable interface 131.

Modeling module 238 enables currently measured data and historical data, for all sensed aspects of controllable element 100, to be simultaneously considered prior to initiating control of, or modifying interfaces for, controllable element 100. Modeling element 238 will develop controls and/or control functions not previously developed, and thus can create new user interfaces and present them for use by an operator of controllable element 100, via modifiable interface 131. This enables "on-the-fly" interface creation and/or modification.

The modeling module 238 is a supervised learning algorithm. A supervised learning algorithm accepts a set of training instances with input features and associated values, and an output or predicted features. The supervised learning algorithm selects the best model for the data, from a set of hypotheses. This model is the model that best predicts the output feature given the input features according to some objective function. The objective function is simply the "best" function; it is a way to measure how well a given model predicts all the output features for all of the training instances. Thus, given a model, and a training set, it returns a real value, and greater values mean a better match between the model and the data.

The modeling module 238 selects from a pre-specified parametric space of possible models. It uses observed data from a user along with manually specified labeling associated with those observations. The modeling system selects models that best predict the manually specified labels given the observations. The labels are the conditions that it is desired to have the modeling module predict. For example, "user is now very distracted" might be a label associated with a particular observation, e.g., eyes diverted from windshield and sound of baby crying. The objective is for the system to be able to make a determination that the user is distracted based on future observations, where no label is manually provided.

For example, the system can learn that when the level of attention of the user to some driving situation (e.g., the passing of another car at a very high speed) is above some threshold level, the user can devote only a portion of their total attention to a navigational system in the car. This learning can be achieved based on analysis of data that has been recorded and stored about drivers, their attention level, and what traffic accidents (for example) occurred at various levels of attention (i.e., an analysis of the distractive elements that were occurring when an accident took place). This data can come from multiple categories, including data generated for all drivers generally; data generated for categories of drivers (e.g., senior citizens, foreigners, male/female, drivers who have had a high number of traffic accidents, driver's reactions to certain weather conditions, etc.); and/or specific data pertaining to a particular driver.

One way of measuring the "level of attention" of a driver is described below. In this example, the eye movements of the driver are tracked and the length of time that the driver's eyes are focused on the road versus how long the driver's eyes are focusing on devices within the vehicle is recorded. Based upon this analysis, assumptions can be made. For example if it is determined that the driver's eyes are focused on the road 95% of the time and on the and-vehicle devices 5% of the time, while the vehicle is traveling at a speed of 30 mph and the traffic level is light and there are no pedestrians nearby, this can be labeled an acceptable level of attention.

If it is instead determined that the driver's eyes are focusing on the road 80% of the time, while they are focusing on in-vehicle devices 20% of the time, and the speed of the vehicle is 60 miles an hour in heavy traffic, this can be labeled an unacceptable attention level.

In another example, the voice patterns of the driver can be measured and analyzed. For example, when a person is tired his or her voice responses are different then when the driver is well-rested and fresh. The drivers speech can be detected using speech recognition methods and a ratio of clear or audible speech to unclear or inaudible speech can be determined. If, for example, this ratio is less than 40% (indicating a fairly well rested driver) and the speed of the vehicle is 30 miles an hour in light traffic, this can be labeled an acceptable attention level. Alternatively, if the driver's speech analysis indicates a ratio of more than 60% (indicating a tired driver) and the speed of the vehicle is 60 mph in heavy traffic, this can be labeled a not-acceptable level of attention.

In another example, the correctness or incorrectness of driver responses to questions posed to the driver e.g., while playing voice games, is observed. The more errors made by the driver while playing the voice games, the higher the probability is that the driver is tired and/or that the driver is in a situation requiring more driver focus on the road. The above examples are given for the purpose of explanation only and are not intended to limit how the level of attention of a driver is measured.

As noted above, the various driving conditions, taking into account environmental conditions, conditions of the driver, etc. are labeled and stored, so that when such combinations of events and conditions occur, the system can take appropriate measures. This labeled data can be used to train a learning system. Initial data regarding users in an environmental conditions can be measured from sensors and collected during test trials in laboratory situations and/or in actual driving situations. This data can be collected and stored onboard (i.e., on the vehicle system itself) or can be obtained by network connections such as connections to the Internet. Typically the data will be labeled after collection and analysis, and once the system is installed and in use, new data is gathered pertaining to the drivers of the vehicle to adapt the system to the habits and proclivities of the specific drivers. In this manner, for example, a driver can be identified as one having quick reactions, slow reactions, etc. and interface modifications can be made accordingly.

Principles for collecting data for learning and labeling can be found in, for example, U.S. Pat. No. 6,505,208, entitled "Educational Monitoring Method and System for Improving Interactive Skills Based on Participants on the Network," and U.S. Pat. No. 6,442,519, entitled "Speaker Model Adaptation Via Network of Similar Users," both of which are incorporated fully herein by reference.

For the purpose of example, assume that the navigation system in the car needs a driver to point to a location on a touch screen displaying an electronic map to confirm the specific directions that the driver is in need of. The system "knows" that when there are many displayed items (e.g., buttons, landmark indicators, etc.) and/or if the displayed items are small, considerable driver attention is required to enable the driver to point to the desired location on the electronic map. The user must glance at the screen, while driving, locate the desired touchpoint from among all of the information displayed on the screen, and then touch the touchpoint to perform the desired operation. In a situation in which the driver is not or cannot devote all attention to the touch screen and the directives associated therewith (e.g., when the vehicle is traveling at 60 mph, in rainy conditions, in moderate-to-heavy traffic), the many displayed items make it difficult for the driver to be able to respond appropriately. To address this problem, the system of the present invention can reconfigure the display of the map so that, for example, all non-essential details are removed and only the most essential information remains (e.g., remove all indicators or landmarks, restaurants, etc.). Further, the map can be "zoomed in" so that it is easier for the driver to see the elements to which they intend to point. This allows the driver to pay less attention to the navigation system and direct more attention to driving.

In this example, there is a correlation between driving situations, driver states, and operations that need to be performed on the interface (the map) and this correlation can be utilized to predict what level of attention would be diverted from the driver to the map without compromising the safety of the driver.

The reconfiguration of the map in this example can be performed in several ways. For example, the control processor 246 can implement a control process that can take results from the modeling module 238 and issue instructions that modify the combined modifiable interface 131. In this example, a "result" is the need to present the information to the driver with a minimal amount of attention diversion. The control process can use rule-based systems (instructions) to dictate how the interface should be modified ("reduce" the number of displayed items, increase the size of displayed items, make colors with more contrast, etc.). The control model can also use statistical methods that correlate some control parameters in the interface and the input data.

A general description of the operation of the interface and the objects of such operation is described in the example below. In this example, the interface modeling of the present invention is represented as a set of "widgets".

Widgets can be considered as abstract user interface units affecting the user interface in general, as a way to express information (visual, audio, other sensors, basic logical elements controlling information flow). Examples of widgets can include:

a. GUI's, e.g., Windows, shells;

b. GUI elements, e.g., buttons (e.g. one or two buttons or more buttons in a navigation map);

c. Dialog interface elements (e.g., questions, prompts, commands);

d. Implanted medical devices (e.g., a pacemaker, which can signal the system that the drive is having, or about to have, a heart attack);

e. Wearable or carryable devices brought by users into an area (e.g. PDA in cars, portable gaming devices by children in cars, cellular telephones in museums that help navigate through museum, etc.);

f. (Meta) rules or subsets of (meta) rules controlling some parts of processes (e.g., rules which can be used to adapt the user interface to a specific situation. For example, if the interface is in a mode where instructions are being "read" to the driver using a speech module, upon receiving input that the driver is Hispanic, a meta rule can activate a speech translation module to cause the speech module to translate the speech to the Spanish language).

Some methods of combining widgets are the following:

a) Simple addition (e.g. switch from a pure visual interface to one that combines visual elements with speech, when appropriate);

b) Correlated composition—e.g. create two buttons, a map and arrows on a navigation screen. Sizes, colors, forms of this representation should be related to be most suitable for a driver with a minimum distraction;

c) Variable representation of widgets—value of widget parameters varies according to some algorithm (e.g., one button might appear brighter than less-important buttons).

Training data is used to study the effect of stimuli on user perception; first, single widgets, then multiple widgets. Some principles of combining widgets and their relationship with other factors (like environment, goals) can be based on HMM techniques.

Techniques for dynamic creation of widgets in the user interface can be described as follows. We relate every abstract user state to its own (abstract) widget (similarly like every phone are related to a HMM phone state—so a sequence of phones is modeled as sequence of HMM states). This state related widget would be represented as an abstract prototype that can be extended to more specific situations.

Operations on widgets (e.g. a navigation map) can be modeled as output of HMM states and the most desirable sequence of operations on widgets can be those that gives the highest probability for a desirable outcome (e.g. minimum driver distraction when s/he observes the navigation map).

The system models the user as a set of "indirect indicators" (e.g., frustration level, attention load, and sleepiness) over time. The induced HMM model of the user is then a parametric user model of those parameters as a function of the past and present environment of the user. This model includes control parameters like the number and type of interfaces presented to the user, operations that can be performed on user interfaces, and other observables such as the temperature in the car, or the number of nearby vehicles, etc.

The parametric user model can then be used to make predictions about the user's present and future states. For example, the parametric user model can take the number of nearby cars, the radio volume level, and whether a heads up display of a map is being shown, and make predictions about how distracted this will make the user. These predictions can then be used by a control system to decide what user interfaces to display to the user.

As an example, consider one indirect indicator in the user model, "attention load", and consider three observables that relate to this indirect indicator:

(1) Braking lag time (the time between detecting that the car in front of the user's car has slowed down, and the time that we detect the driver of the user's car is braking);

(2) Response lag time, (the number of milliseconds between a question being presented verbally to the driver and the time that the driver responds to the question); and (3) User squelch (when very overloaded a driver may "turn off" or silence the system. Thus this silencing operation itself is an indicator of a high attention load).

Learning the User Model—Part (1)

The system of the present invention has an initial parametric model that relates these three observables to a hidden indirect indicator called "attention load". By looking at correlations between these three indicators this parametric model can be updated to more accurately tie these three observables to the "attention load" level. The probability that the driver will silence the system at each different attention load level, and the mapping between braking lag time and attention load level, etc. are all updated.

Learning the User Model—Part (2)

The system of the present invention also has a parametric model of attention load level over time. This user model accepts the current state of the environment, e.g. how many cars are near, temperature in the vehicle, and the status of the GUI, and makes predictions about the future "attention load" level. From the part of the user model learned in part (1) above it is possible to use observed braking time, response lag time, etc. to predict an estimate for attention load at each time point during the driver's activity. Now, a parametric model of that indirect indicator is learned from data obtained in this and in previous time periods. The learning algorithm selects parameter values in the model that minimizes the models prediction error against this estimated attention load.

For simplicity of explanation, assume that the parametric model is a simple "sum of linear weights" model. So the attention load will be estimated as some linear function of the number of near cars, the temperature inside the car, and different weights added for each possible GUI component displayed to the driver. By observing how much the driver's reactions are slowed, it is possible to obtain a quantitative measure of the impact of each possible user interface component. Assume, for example, that historically, reaction times are dramatically increased when auditory directions are provided to the user. This will be captured by the learning algorithm as a large coefficient on the "attention load impact" of an audible-directions interface.

The control system can then use this parametric model to predict how much of an impact providing such auditory directions will have in the current environment. If that impact will push the users attention load unacceptably high, then the control process will opt not to provide auditory directions to the user, until conditions on the road are lighter, so that providing auditory direction will not push the users attention beyond specified operating objectives.

In this example, a simple linear model is assumed for predicting the user's indirect indicators, but the same basic procedure will continue to work on more complex models where non-linear effects are seen. Models can combine terms that allow for interactions between features, as well as non-linear effects. For example, perhaps in some models the user's attention is not impacted at all by lower levels of distraction, but is sharply impacted beyond some threshold. Such non-linearities can be handled by more complex models (e.g. polynomial curve fitting).

Figure 3:
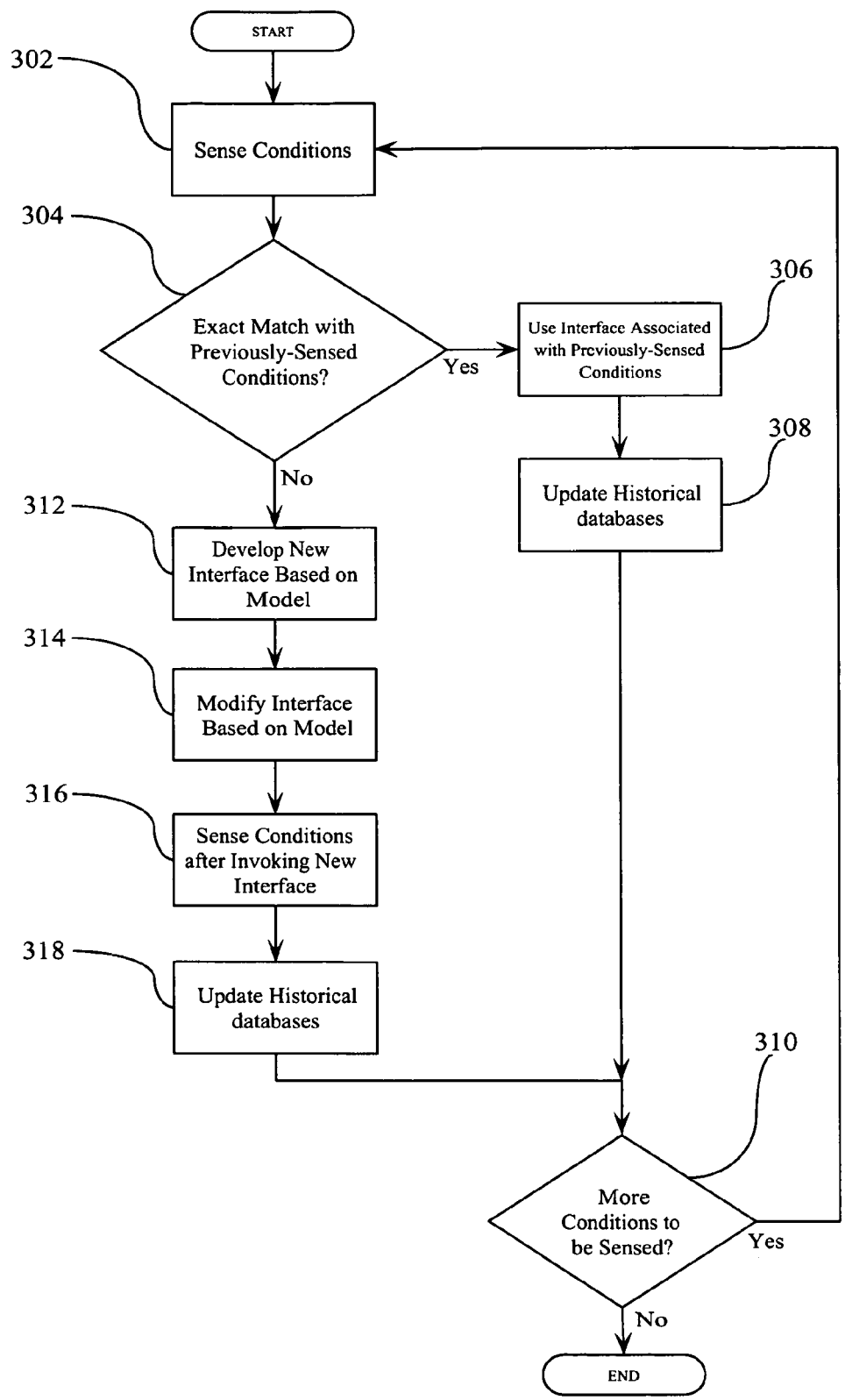
FIG. 3 is a flowchart illustrating a basic set of steps performed in accordance with the present invention.

FIG. 3 is a flowchart illustrating a basic set of steps performed in accordance with the present invention. At step 302, conditions are sensed with respect to the controllable element. These conditions can be any or all of the conditions sensed by environment sensor 102, user condition sensor 104, and control status sensor 106, as well as any other conditions that it is desired to sense. As noted above, although environment sensor, user condition sensor, and control status sensors are illustrated with respect to FIG. 1, it is understood that any conditions desirable for sensing can be sensed by the present invention.

At step 304, a determination is made as to whether or not there is an exact match between the sensed conditions and previously-sensed conditions. This is performed, by for example, comparing historical conditions with the currently-sensed conditions. If it is determined that there is an exact match with previously-sensed conditions, the process proceeds to step 306, where the user interface associated with the previously-sensed conditions is presented to the controllable element, and at step 308, the historical databases are updated. The process then proceeds to step 310, where a determination is made as to whether or not there are additional conditions to be sensed. If there are no additional conditions to be sensed, the process ends. If, however, there are additional conditions to be sensed, the process proceeds back to step 302, where the new conditions are sensed as described above.

If, at step 304, it is determined that there is not an exact match with previously-sensed conditions, this indicates that there is something new occurring that has not been previously addressed by the system. In this situation, the process proceeds to step 312, where a new interface is developed based upon modeling algorithms being applied to the newly-sensed conditions.

At step 314, the modifiable interface is modified based upon the newly-created model. At step 316, conditions are sensed after invoking the new interface, to identify how the sensed conditions have changed after invoking the new interface, if at all. The process then proceeds to step 318, where the historical databases are updated with the data derived from steps 312, 314, and 316. In this manner, the system "learns" what works and what does not work, and also learns how changing certain parameters will change the conditions with respect to the controllable element.

The process then proceeds to step 310, to determine if there are additional conditions to be sensed and proceeds as described above.

Configuring the system in the above-described manner provides several beneficial results and provides beneficial opportunities for improvement of the overall system. For example, on a very basic level, coordinating the control of the controllable element 100 based on input from all sensors, rather than individually controlling aspects of controllable element 100 based upon individual information sensed by the individual sensors leads to the ability to identify with more granularity those situations requiring control changes, and situations which might appear to require control changes but, in reality, should not have control changes implemented (e.g., the passing example illustrated above), etc.

On a higher level, by having this ability to individually monitor and implement coordinated control, predictive user modeling can be used to identify and implement changes to a user interface, on the fly, to cover situations that have not been previously identified by the designers. This makes the control operations much more flexible and adaptable to situations and allows not only for the control function to be adapted, but also allows for the modeling system to predict how the condition of a user will change in view of current conditions, thus allowing implementation of preemptive control measures, rather than the implementation of after-the-fact corrective measures as is done by the prior art systems.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of a vehicle system installed in a vehicle. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. A method of facilitating machine interaction with a user, comprising the steps of:

identifying a current user emotional state of a user;

recognizing in real time a current situation involving said user by:

measuring current physical properties of said user;

measuring current environmental conditions affecting said user; and recognizing the current situation involving said user based on said measured current physical properties and said measured current environmental conditions;

identifying a plurality of possible user interface components to provide to the user;

calculating a quantitative measure of impact on a state of the user for each of the plurality of possible user interface components;

predicting desired user states for said user based on said current user emotional state and said current situation using a supervised learning algorithm; and dynamically creating a new user interface comprising one or more user interface components selected from the plurality of possible user interface components, based on said desired user states, said current user emotional state, and said current situation, wherein the one or more user interface components selected from the plurality of possible user interface components are selected such that a sum of the quantitative measures of impact for the selected user interface components does not exceed a specified threshold value, wherein the current physical properties of the user comprise an indication received from a medical device that the user is having or is about to have a heart attack.

2. The method of claim 1, further comprising the step of: presenting said created new user interface to said user.

3. The method of claim 2, wherein said presentation of said created new user interface to said user causes said current state of said user to change to a new current user state.

4. The method of claim 3, wherein said step of predicting desired user states is performed using a modeling algorithm.

5. The method of claim 4, wherein said machine comprises a vehicle equipped with a telematics system.

6. The method of claim 1, wherein said current physical properties include properties affecting a mental and/or emotional state of said user.

7. The method of claim 1, wherein the specified threshold value is a threshold value for attention load level of the user.

8. The method of claim 7, further comprising:
generating a parametric model of attention load levels of the user over time.

9. A system of facilitating machine interaction with a user, comprising:
means for identifying a current user emotional state of a user;
means for recognizing in real time a current situation involving said user, said means for recognizing including:
means for measuring current physical properties of said user;
means for measuring current environmental conditions affecting said user; and
means for recognizing the current situation involving said user based on said measured current physical properties and said measured current environmental conditions;
means for identifying a plurality of possible user interface components to provide to the user;
means for calculating a quantitative measure of impact on a state of the user for each of the plurality of possible user interface components;
a supervised learning algorithm predicting desired user states for said user based on said current user emotional state and said current situation; and
means for dynamically creating a new user interface comprising one or more user interface components selected from the plurality of possible user interface components, based on said desired user states, said current user emotional state, and said current situation: wherein the one or more user interface components selected from the plurality of possible user interface components are selected such that a sum of the quantitative measures of impact for the selected user interface components does not exceed a specified threshold value, wherein the current physical properties of the user comprise an indication received from a medical device that the user is having or is about to have a heart attack.

10. The system of claim 9, further comprising: means for presenting said created new user interface to said user.

11. The system of claim 10, wherein said presentation of said created new user interface to said user causes said current state of said user to change to a new current user state.

12. The system of claim 11, wherein said supervised learning algorithm comprises a modeling algorithm.

13. The system of claim 12, wherein said machine comprises a vehicle equipped with a telematics system.

14. The system of claim 9, wherein said current physical properties include properties affecting a mental and/or emotional state of said user.

15. A computer program product for facilitating machine interaction with a user, the computer program product comprising a non-transitory computer-readable storage medium having computer-readable program code embodied in the medium, the computer-readable program code comprising:
computer-readable program code that identifies a current user emotional state of a user;
computer-readable program code that recognizes in real time a current situation involving said user by:
measuring current physical properties of said user;
measuring current environmental conditions affecting said user; and
recognizing the current situation involving said user based on said measured current physical properties and said measured current environmental conditions;
computer-readable program code that identifies a plurality of possible user interface components to provide to the user;
computer-readable program code that calculates a quantitative measure of impact on a state of the user for each of the plurality of possible user interface components;
computer-readable program code that executes a supervised learning algorithm to predict desired user states for said user based on said current user emotional state and said current situation; and
computer-readable program code that dynamically creates a new user interface comprising one or more user interface components selected from the plurality of possible user interface components, based on said desired user states, said current user emotional state, and said current situation, wherein the one or more user interface components selected from the plurality of possible user interface components are selected such that a sum of the quantitative measures of impact for the selected user interface components does not exceed a specified threshold value, wherein the current physical properties of the user comprise an indication received from a medical device that the user is having or is about to have a heart attack.

16. The computer program product of claim 15, further comprising: computer-readable program code that presents said created new user interface to said user.

17. The computer program product of claim 16, wherein said presentation of said created new user interface to said user causes said current state of said user to change to a new current user state.

18. The computer program product of claim 17, wherein said computer-readable program code that predicts desired user states comprises a modeling algorithm.

* * * * *